United States Patent [19]

Bagwell

[11] Patent Number: 5,533,272
[45] Date of Patent: * Jul. 9, 1996

[54] METHOD AND DEVICE FOR DETERMINING THE STRAIGHTNESS AND BALANCE OF AN ARROW

[76] Inventor: Johnny Bagwell, 380 Richardson Rd., Calhoun, Ga. 30701

[*] Notice: The term of this patent shall not extend beyond the expiration date of Pat. No. 5,435,071.

[21] Appl. No.: 375,719

[22] Filed: Jan. 20, 1995

Related U.S. Application Data

[63] Continuation-in-part of Ser. No. 103,590, Aug. 9, 1993, Pat. No. 5,435,071.

[51] Int. Cl.$^6$ ............................................. G01M 1/16
[52] U.S. Cl. ........................ 33/506; 33/533; 73/460; 73/865.9
[58] Field of Search .......................... 33/506, 533, 501, 33/549, 550, DIG. 1; 273/416; 73/460, 461, 487, 432.1

[56] References Cited

U.S. PATENT DOCUMENTS

| | | |
|---|---|---|
| 2,389,206 | 11/1945 | McKinney et al. . |
| 2,766,909 | 10/1956 | Doyle . |
| 2,831,260 | 4/1958 | Shaw . |
| 3,068,573 | 12/1962 | Sidwell . |
| 3,180,528 | 4/1965 | Balint et al. . |
| 3,333,474 | 8/1967 | Hercher ............................. 73/460 |
| 4,155,172 | 5/1979 | Bartol . |
| 4,497,207 | 2/1985 | Schaaf ............................. 73/432.1 |
| 4,623,410 | 11/1986 | Hillesheim et al. .................. 33/506 |
| 4,937,947 | 7/1990 | Catterlain et al. .................. 33/550 |
| 5,121,549 | 6/1992 | Gudausky, Jr. ..................... 33/533 |
| 5,154,001 | 10/1992 | Ester ............................. 33/506 |
| 5,301,436 | 4/1994 | Johnston .......................... 33/506 |
| 5,435,071 | 7/1995 | Bagwell ........................... 33/506 |

*Primary Examiner*—Christopher W. Fulton
*Attorney, Agent, or Firm*—Hopkins & Thomas

[57] ABSTRACT

A method is provided for determining the straightness and balance of an archery arrow having a longitudinal axis and a magnetically attractive tip. The method comprises providing a magnet located in an elevated position, suspending the arrow by its tip from the magnet with the arrow's shaft passing through a stationary ring, spinning the suspended arrow about its longitudinal axis, and observing perturbations in movement of the spinning arrow relative to the ring that are indicative of warp or imbalance in the arrow. A device for performing the method of this invention is also provided. The device comprises a support frame having one end configured to be mounted to a wall or the like and another end bearing a magnet from which an arrow can be suspended. Preferably, the magnet is formed with a dimple for receiving and positioning the tip of an arrow for which straightness and balance are to be determined.

22 Claims, 3 Drawing Sheets

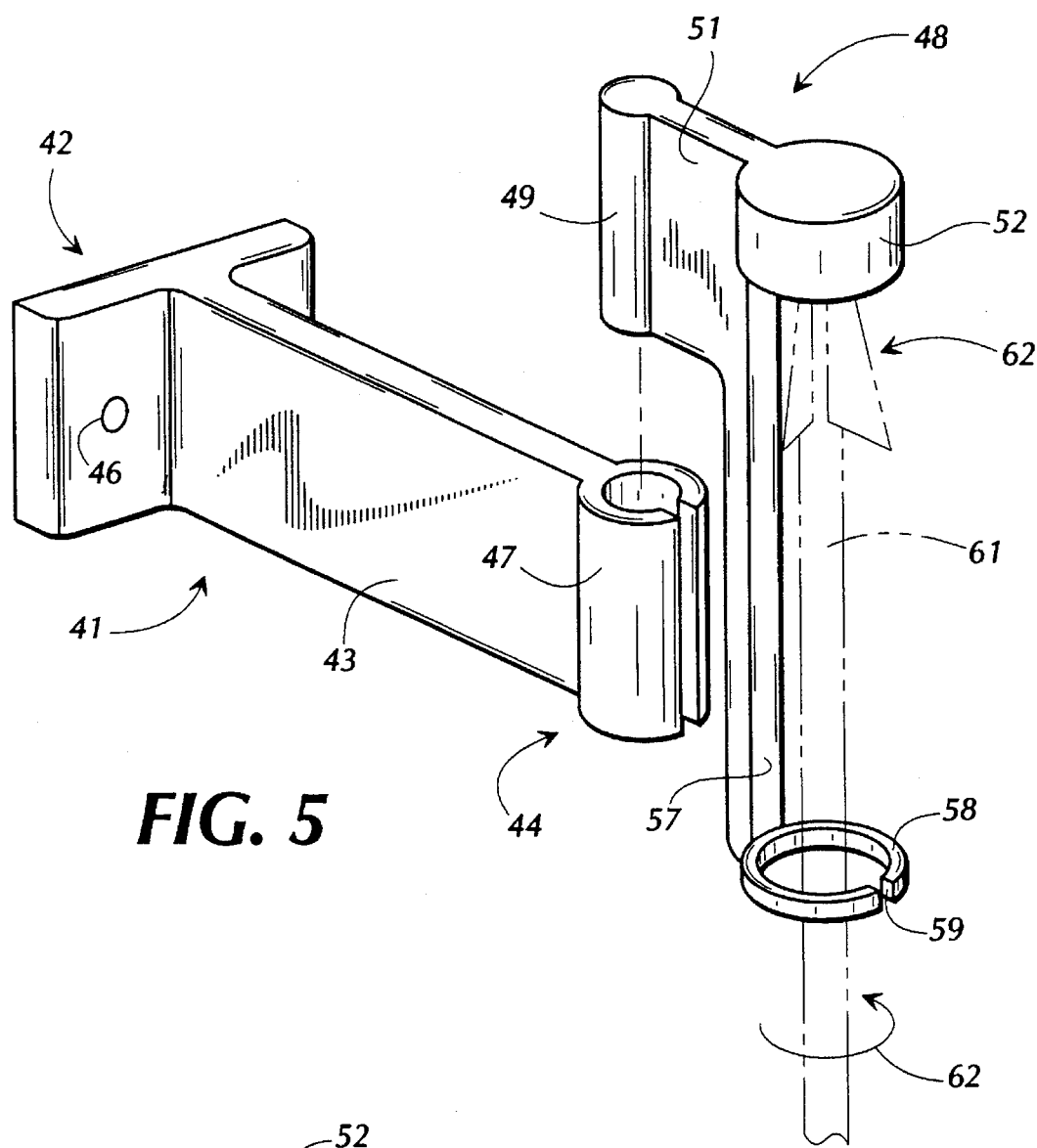
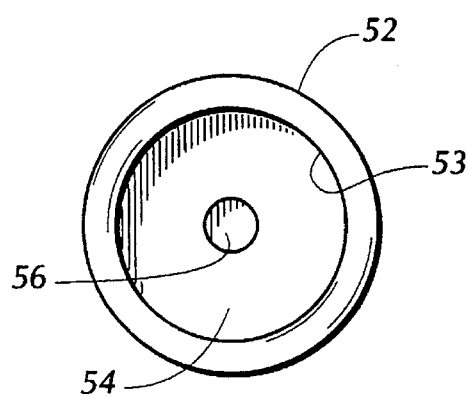

METHOD AND DEVICE FOR DETERMINING THE STRAIGHTNESS AND BALANCE OF AN ARROW

REFERENCE RELATED TO APPLICATION

This application is a continuation-in-part of U.S. patent application Ser. No. 08/103,590 filed Aug. 9, 1993 now U.S. Pat No. 5,435,071.

TECHNICAL FIELD

This invention relates generally to archery and more particularly to devices and procedures for use in determining the physical condition of archery arrows.

BACKGROUND OF THE INVENTION

It has long been known in the field of archery, bow hunting, target shooting, and the like that use of an archery arrow that is warped or imbalanced can seriously affect a shooter's accuracy, even if a shot is executed properly. It is therefore highly desirable, particularly when hunting or competing with a bow and arrow, that each arrow used be straight and balanced, or, in other words, that the arrows be true.

Various methods and devices have been used by archers in the past for determining whether or not their arrows are true. In some cases, the archer simply spins the arrow between the palms of his hands and attempts to "feel" any imperfections in the arrow. Archers have also been known to balance an arrow in the palm of a hand and manually spin the arrow while balanced, again in an attempt to "feel" perturbations in the arrow's spin that would indicate a defect. Each of these methods must sometimes be relied upon, particularly when an archer is in the filed without access to more sophisticated equipment. However, they tend to be highly insensitive to all but the grossest imperfections in the arrow and thus give only a rough indication of the arrow's condition.

More sophisticated methods and devices for determining the trueness of an archery arrow have also been developed. These include the arrow straightness gauge disclosed in U.S. Pat. No. 4,155,172 of Bartol. The gauge comprises an elongated rigid rod having a longitudinal bore extending therethrough. The bore has a diameter slightly larger than the diameter of the shaft of an arrow to be tested. In use, an arrow is simply inserted through the longitudinal bore. If the arrow fits freely in the bore, then it is straight within the tolerances of the bore. If it becomes jammed in the bore, then it is unacceptably warped.

The Bartol device is a step in the right direction but nevertheless is lacking in many important respects. For example, the device is limited in accuracy because of restrictions on the size of the bore imposed by slightly different arrow shaft diameters from one brand to another or even within brands. Furthermore, the Bartol device only provides for a check of an arrow's straightness and gives no indication of whether the arrow is balanced or imbalanced, which is also an important factor in assuring shooting accuracy.

Another previous device for checking the trueness of arrows is disclosed in U.S. Pat. No. 5,121,549 of Gudausky. In this device, an arrow is laid horizontally between spaced stands with the arrow shaft being supported between pairs of rotatable disks mounted in each stand. The arrow can then be rotated while supported on the disks so that imperfections in the arrow can be observed.

Like the Bartol device, Gudausky, while somewhat useful, is nevertheless plagued with various inherent shortcomings that can render it less than satisfactory. For instance, the device is highly dependent on the absolute accuracy with which the rotating disks are formed since even a slightly out-of-round or off-centered disk would falsely indicate a defect in the arrow. Further, the Gudausky device, like Bartol, provides an indication only of straightness and not of balance. This is because the weight of the arrow must at all times remain supported by the disks so that rotational perturbations that might be caused by imbalance as the arrow spins are damped out and not observable. Thus, Gudausky, too, falls short of the mark.

Accordingly, there exists a persistent and heretofore only partially addressed need for a reliable, simple, inexpensive, and accurate method and device for determining quickly both the straightness and balance of an archery arrow. It is to the provision of just such a method and apparatus that the present invention is primarily directed.

SUMMARY OF THE INVENTION

Briefly described, the present invention comprises a simple and elegant method for determining simultaneously and accurately both the straightness and balance, i.e. the trueness, of an archery arrow. In one preferred embodiment, the method is intended for use with archery arrows having magnetically attractive tips; however, the method might well be adapted to other types of arrows or to checking the trueness of any type of elongated rod.

The method comprises the steps of providing a magnet located in a position elevated above the floor or other surface a distance at least equal to the length of arrows for which trueness is to be checked. Preferably, the magnet is formed with a small dimple or indention on its underside for receiving and accurately positioning the tip of an arrow as it is being checked. With the magnet thus configured and positioned, the magnetically attractive ferrous tip of an arrow to be checked is brought into contact with the underside of the magnet within the dimple formed therein. The magnet attracts and rotatably secures the arrow tip so that the arrow becomes hung or suspended beneath the magnet in a vertical orientation. The bottom or neck portion of the arrow is then grasped between the thumb and finger and spun rapidly while the arrow remains suspended beneath the magnet. Since the magnet provides very little resistance to rotation of the arrow, the arrow is free to spin rapidly and for an extended time.

As the suspended arrow spins, even small variations in the straightness of the arrow's shaft tend to impart a lateral wobbling motion to the arrow. Such motion can easily be observed as an indication of a defect in the arrow. Furthermore, even if the arrow is straight, it might still be imbalanced because, perhaps, of imbalanced fletching, poor shaft extrusion, or the like. Such a condition is simply undetectable using prior art methods and devices. However, with the present invention, even small variations in the arrow's balance quickly become apparent through lateral perturbations in the spinning arrow's motion. Such sensitivity to imbalance is provided because the arrow shaft hangs free and untouched and the magnet imparts only very small friction to the rotating arrow tip. Thus the arrow virtually floats in space to provide maximum possible sensitivity to both warp and imbalance in its shaft.

The device for accomplishing the method of this invention comprises an elongated support frame that is configured to be mounted to a wall at one end and, once mounted, extends outwardly from the wall to a distal end portion. The distal end portion of the support frame bears on its underside a magnet having a dimple formed therein for receiving an arrow's tip. Further, the support frame is sized to locate the magnet at a location spaced from the wall a distance sufficient to allow the arrow and its fletching to clear the wall when spinning. With this configuration, the support frame is mounted to a wall and arrows can simply be suspended from the magnet and spun to determine the trueness of the arrows as discussed above.

In an alternate embodiment, a support frame mounts to a wall and extends outwardly therefrom to a distal end. The distal end is provided with means for receiving and releasably securing a spinner head assembly. The spinner head assembly comprises a head having a magnet therein for holding the tip of an arrow to be spun. The spinner head assembly also includes a slotted ring mounted on a vertical arm and positioned below and aligned with the magnetic head. In use, the spinner head assembly of this embodiment is secured to the distal end of the support frame. The shaft of an arrow to be checked is then slipped into the slotted ring and the arrow tip is brought into contact with the magnet of the head. The tip is attracted to the magnet and the arrow becomes suspended therefrom with its shaft passing through the slotted ring below the head. When the arrow is spun about its axis, the stationary slotted ring provides a reference against which even the slightest lateral motion of the shaft can be detected visually. Thus the sensitivity of the device is enhanced. In addition, should the arrow fall from the magnet, the ring tends to catch the bladed tip of the arrow preventing the arrow from falling to the ground where it can become bent or otherwise damaged.

The device of the present invention is simple, rugged, inexpensive to manufacture, and, most importantly, provides for simultaneous determination of both the straightness and balance of an arrow with an accuracy unprecedented in the prior art. Thus, the present invention clearly provides a significant advance over the prior art. A more precise understanding of the function and structure of the invention will be realized upon review of the detailed description set forth below taken in conjunction with the accompanying drawings, which are briefly described as follows.

BRIEF DESCRIPTION OF THE DRAWINGS

FIG. 5 is a perspective view of an arrow trueness checker that embodies principles of the invention in an alternative form.

FIG. 6 is a view of the bottom of the arrow support head of the embodiment of FIG. 5 showing the magnet fixed therein.

DETAILED DESCRIPTION OF THE PREFERRED EMBODIMENT

Figure 1:
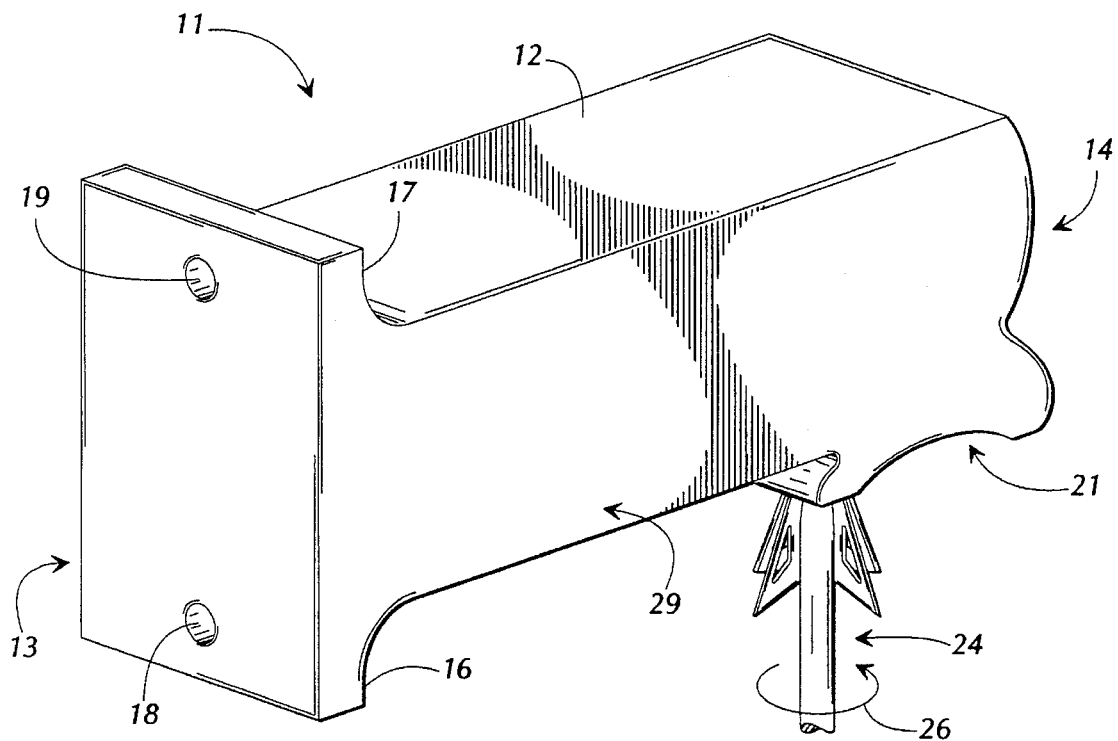
FIG. 1 is a perspective illustration of a device for checking the trueness of an arrow that embodies principles of the present invention in a preferred form.

Referring now in more detail to the drawings, in which like numerals refer to like parts throughout the several views, FIG. 1 is a perspective view illustrating a device that embodies principles of the present invention in a preferred form. The device 11 is seen to comprise a support frame 12 that has a generally elongated configuration with a first end portion 13 and a second end portion 14. The first end portion 13 is formed with downwardly and upwardly extending ears 16 and 17 respectively. The downwardly extending ear 16 has a bore 18 extending therethrough and, likewise, upwardly extending ear 17 has a similar bore 19. The ears 16 and 17 and their bores 18 and 19 provide a convenient means for mounting the device 11 to a vertical structure such as a wall in such a way that the support frame 12 extends outwardly from the structure to its second end portion 14. The second end portion 14 is thus spaced from the wall or other structure when the device is mounted thereto.

The second end portion 14 of the support frame 12 is formed to define an arch 21 that is located on the underside of the support frame 12 and that is curved and faces downwardly when the device 11 is mounted to a wall or other vertical structure. The lower curved surface 22 (FIG. 2) of the arch 21 is configured to receive and support a magnet 23. As described more fully below, the magnet 23 is designed to receive and releasably but rotatably secure the magnetically attractive tip of an archery arrow 24 for suspending the arrow from the magnet 23. When so suspended, the archery arrow 24 can be spun as indicated by arrow 26 for determining the straightness, balance, and trueness of the arrow, as detailed below.

Figure 2:
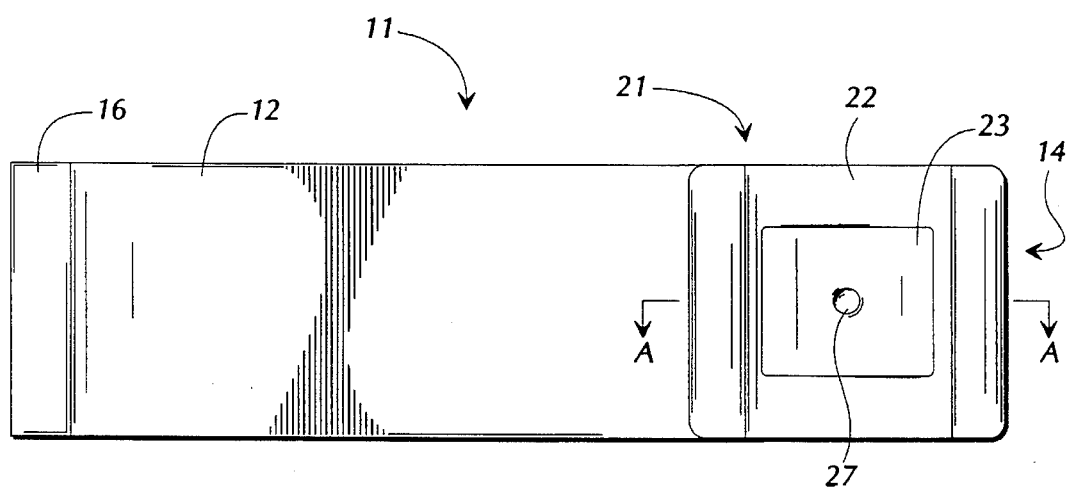
FIG. 2 is a bottom plan view of the device of FIG. 1 showing the dimpled magnet mounted beneath the distal end of the support frame.
Figure 3:
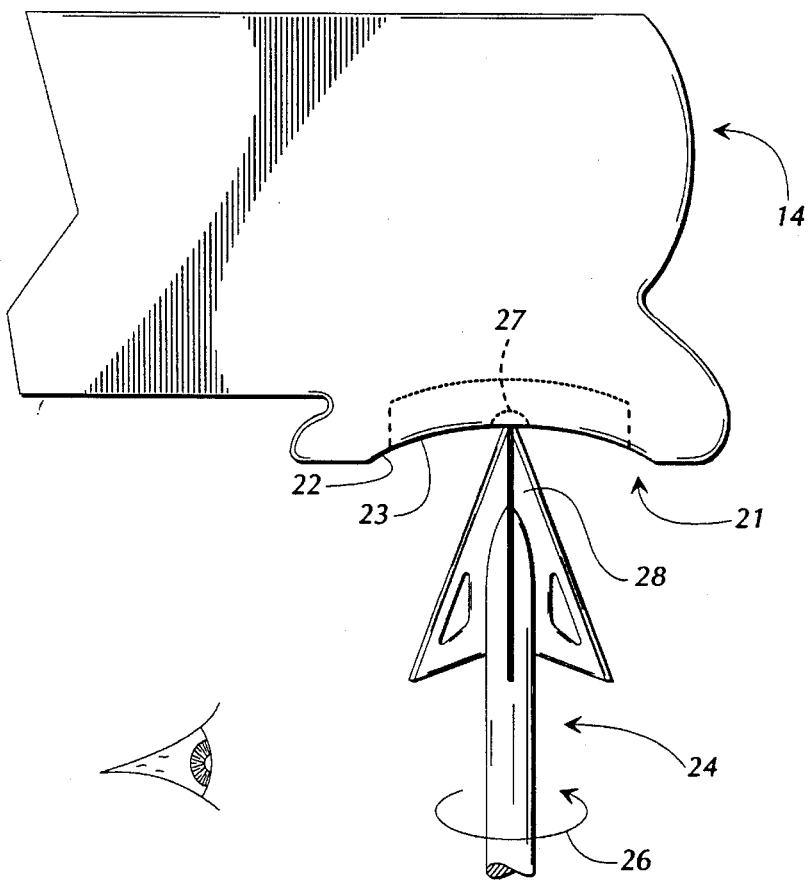
FIG. 3 is an enlarged side view of the magnet bearing end of the device showing a preferred way of securing the magnet within the support frame.
Figure 4:
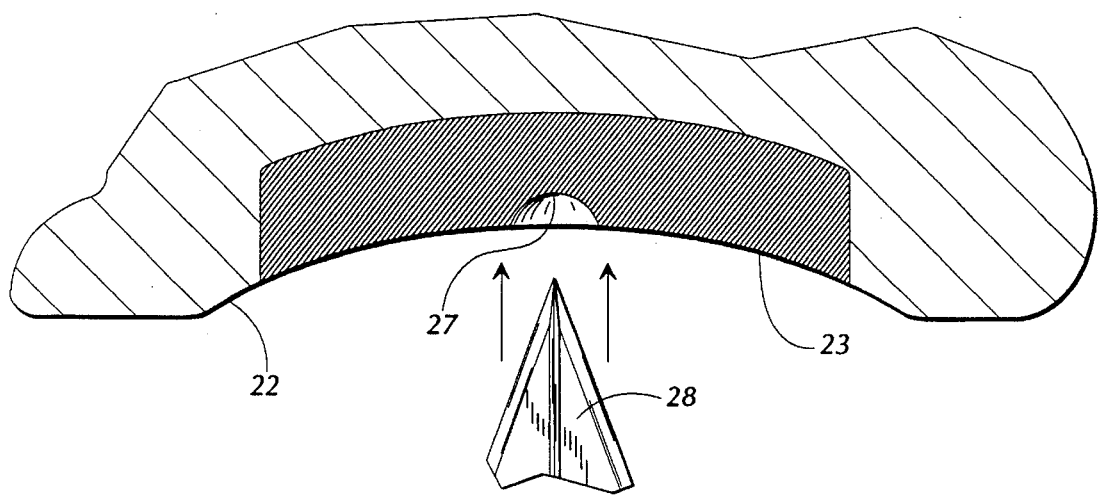
FIG. 4 is an enlarged sectional view taken along line A—A of FIG. 2 and showing in detail the relationship between the support frame, magnet, dimple, and arrow tip.

In FIG. 2, the magnet 23 is seen to be secured within the body of the support frame at the arch 21. The magnet is also formed with an arched or curved lower surface as best seen in FIGS. 3 and 4. Preferably, the lower surface of the arch 21 is formed with a substantially square indention sized to receive the magnet 23. The curved lower surface of the magnet 23 preferably is formed to have a curvature that matches that of the arch 21. In this way, the lower surface of the magnet 23 is substantially co-extensive with the lower surface 22 of the arch 21 when the magnet is mounted in the device 11.

The magnet 23 is provided with a small central detente or dimple 27 for receiving and positioning the tip of an arrow as the arrow is being checked with the device 11. While the dimple 27 can be positioned anywhere on the surface of the magnet 23, a central positioning as illustrated in FIG. 2 has been found to be preferable since the curved lower surface of the magnet naturally tends to direct the arrow tip to the dimple when the tip is brought into contact with the magnet.

FIG. 3 is a close-up illustration of the second end portion 14 of the device 11 illustrating more clearly the arch 21, magnet 23, dimple 27, and the positioning of an arrow 24. The arrow 24 is seen to have a tip 28 that is formed of a ferrous or other magnetically attractive material. In practice, most archery arrows used for hunting and target shooting include such magnetically attracted tips. The configuration of the tip 28 illustrated in FIGS. 1–4 is typical of an arrow used for hunting. It will be understood by those of skill in this art, however, that numerous tip configurations are available and used depending upon the purpose for which the arrow is intended. Virtually all such arrow designs are formed with a point at their tips such that the present invention functions well with almost any archery arrow used by modern archers.

In FIG. 3, the magnet 23 is seen to be imbedded within the substantially square indention formed in the lower surface 22 of the arch 21 so that the lower surface of the magnet is substantially co-extensive with the arch lower surface 22. This configuration not only presents a neat appearance, it also aids in locating the arrow tip properly on the magnet since the tip tends to migrate naturally to the center of the curved magnet and into the dimple 27 formed therein.

In FIG. 3, the arrow tip 28 is seen to be positioned within the dimple 27 as it is when the straightness and balance of the arrow is being determined. Thus, the arrow is suspended in mid-air from its tip 28 and extends vertically downwardly to its lower end (not shown), which bears the fletching and the neck of the arrow. When thus suspended and spun as indicated by arrow 26, the arrow tip 28 is maintained in position by the dimple 27 so that the arrow does not migrate around on the lower surface of the magnet 23. Further, since there is nothing to interfere with the rotary motion of the arrow, any wobbling or lateral motion of an arrow can be attributed solely to imperfections in the arrow and not to any outside influences.

FIG. 4 is an enlarged sectional view of the arch 21 taken along lines A—A of FIG. 2. Again, the magnet 23 is seen to be embedded in the material of the support frame 12 so that the magnet's curved lower surface is co-extensive with the lower surface 22 of the arch 21. The central dimple 27 is small relative to the surface of the magnet 23. In this way, the tip of the arrow is maintained in substantially the same place on the magnet as the arrow spins so that migration of the arrow around the magnet's surface does not impart false lateral motion to the spinning arrow.

The dimple 27 can be formed to have numerous shapes such as, for example, a cone or a sphere section. It is believed, however, that a parabolically-shaped dimple is preferable since the increasing curve of the parabola's walls tend to maintain the arrow tip precisely at the apex of the parabolic dimple 27.

The support frame 12 of the present invention may be formed in various ways and with various materials. For example, a prototype formed of carved hardwood has been found to function very well. Preferably, however, the support frame 12 is formed of a rigid, rugged, injection-molded plastic making the device 11 inexpensive to manufacture in large quantities. Further, a molded plastic fabrication technique allows for easy and simultaneous formation of the recess in the bottom of the arch 21 that receives and holds the magnet 23 as best illustrated in FIG. 4. In addition, injection molding allows for easy application of a trademark or other indicia 29 in such a way that the indicia appears to be carved or etched into the surface of the support frame 12.

FIG. 5 is a perspective illustration of an alternate embodiment of the present invention. This embodiment comprises a bracket 41 having a T-shaped proximal end 42 from which an arm 43 extends to a distal end 44. The T-shaped proximal end 42 is adapted to be mounted to a wall and, for this purpose, is provided with screw holes 46. When the bracket 41 is mounted to a wall, its arm 43 extends outwardly from the wall to position the distal end 44 in spaced relationship with the wall. The distal end 44 of the bracket 41 is formed to define a slotted collet 47 having an open top and a closed bottom.

A spinner head assembly 48 is adapted to be releasably secured to the distal end 44 of the bracket 41. The spinner head assembly 48 is formed with a cylindrical mounting lug 49 from which a support tang 51 radially extends. The lug 49 is sized to be received into the slotted collet 47 of the bracket 41 with the support tang 51 extending from the interior of the collet through the slot therein to a position just beyond the collet. In this way, the spinner head assembly 48 can be releasably mounted to the bracket 41 by sliding the lug 49 into the collet until the lug 49 engages the closed bottom of the collet. The spinner head assembly 48 is thus held firmly in place but can easily be removed if desired for compact storage or exchange for a different size or type spinner head assembly.

A generally cylindrical magnet head 52 is formed on the upper edge of the tang 51. As best illustrated in FIG. 6, the head 52 is formed with a recess 53 on its bottom side. The recess 53 is sized to receive and hold a magnet 54 for suspending the tip of an arrow to be checked as described more fully below. The magnet 54 preferably is secured within the recess 53 by means of an appropriate adhesive. If desired, the magnet 54 can be formed with a central concave dimple 56 for receiving and positioning the tip of an arrow as the arrow is spun and checked for balance.

A vertically oriented arm 57 extends downwardly from the tang 51 to a lower end. A slotted ring 58 is formed on the lower end of the vertical arm 57. The ring 58 is generally annular in shape and is formed with a small slot or opening 59 through which the shaft of an arrow can be pressed during use of the invention. The slotted ring 58 is positioned directly below the head 52 and is axially aligned with the magnet 54 fixed within the head 52. In this way, the shaft of an arrow suspended from the magnet 54 passes through the center of the ring 58 for the advantageous purposes described below.

In use, the bracket 41 is mounted to a wall and the spinner head assembly 48 is removably mounted to the distal end 44 of the bracket by inserting the lug 49 downwardly through the slotted collet 47. An arrow 61 can then be tested for balance and trueness by snapping the arrow shaft through the slot 59 in the ring 58 and engaging the arrow tip with the magnet 54 in the magnet head 52. The arrow tip is attracted to and held by the magnet so that the arrow becomes suspended from the magnet in a vertical orientation with its shaft passing through the center of the slotted ring 58. The arrow 61 can then be spun between the thumb and forefinger as indicated at 62.

The spinning arrow is then observed to detect any lateral perturbations in its motion that would indicate an untrue or out-of-balance condition. For this purpose, the slotted ring provides a fixed reference structure against which motions of the arrow shaft can be judged. It has been found that the presence of the fixed slotted ring 58 provides for eyeball detection of even the minute lateral perturbations of the arrow shaft as it spins about its axis. In addition, should the arrow tip become disengaged from the magnet for any reason, the slotted ring 58 tends to catch the broadhead 62 of the arrow, thus preventing the arrow from falling to the ground and becoming bent or otherwise damaged.

Once the condition of the arrow has been determined, the arrow can be removed from the device simply by grasping its shaft, dislodging the tip of the arrow from the magnet, and moving the arrow shaft out of the slotted ring 58 through the slot 59.

As discussed briefly above, the embodiment of FIGS. 1–4 is also used for determining the straightness and balance or, in other words, the trueness, of an archery arrow. For this purpose, the device 11 is mounted to a structure, such as a vertical wall, in a position elevated a distance at least equal to the length of arrows for which trueness is to be determined. Preferably, the device is mounted on a vertical wall at approximately eye level so that the device can be used easily and conveniently.

With the device 11 so mounted, its second end portion 14 and, consequently, the magnet 23 is located at a position spaced from the wall so that an arrow, its tip, and its fletching, when suspended from the magnet, clears the wall by a comfortable distance.

When the device is mounted in an elevated position as described, the magnetically attractive tip 28 of an arrow to be checked is brought into contact with the lower surface of the magnet 23. Slight movement of the arrow tends to slide the tip across the curved surface of the magnet so that it is directed to the dimple 27, which receives and positions the tip as best shown in FIG. 3. The composition and strength of the magnet 23 is selected to support the weight of the archery arrow 24 so that, when properly positioned, the arrow becomes suspended in mid-air by its tip 28 from the dimple 27 of the magnet 23. It can readily be seen that with the arrow suspended in this way, the arrow can easily be rotated and, in addition, an almost negligible amount of resistance to the arrow's rotation is derived from friction between the arrow tip and the magnet. Thus, the arrow can rotate freely with virtually no interference from any outside structure or force.

With the arrow suspended form the device, a user simply grasps the neck of the arrow between his thumb and forefinger and gives the arrow a twist to initiate spinning motion as indicated by arrow 26. The suspended spinning arrow is then observed by the user to detect any lateral movement or perturbations of the arrow shaft that would indicate that the arrow is either not straight or is imbalanced. Since friction and other outside forces are virtually eliminated, even very small defects in the straightness or balance of the arrow become obvious through lateral perturbations in the suspended spinning arrows motion. On the other hand, if the arrow is straight, balanced, and true, its spinning shaft will exhibit no lateral perturbations and the user can be assured that the arrow is in prime condition for use. If the arrow does exhibit perturbations indicative of a defect, the user can discard the arrow or, alternatively, repair it to correct the defects.

Thus, the method of determining the straightness and balance of an archery arrow embodied in the present invention is easy, convenient, quick, and, most importantly, highly reliable in determining the trueness of the arrow. Furthermore, not only the straightness but the balance of the arrow is determined simultaneously as the arrow spins so that both of these types of defects can be checked accurately and at the same time. Finally, the device 11 of the present invention is economical to produce, virtually indestructible, highly reliable, simple in design, and elegant in operation.

The present invention has been described herein in terms of preferred embodiments and methodologies. It will be clear to those of skill in this art, however, that numerous variations of the illustrated embodiments might well be employed with similar results. For example, the particular configurations of the support frame and spinner head assembly illustrated in the drawings is considered preferable; however, virtually endless shapes might well be employed without affecting the function of the device. Further, the curved lower surface of the arch 21 and magnet 23 is preferable because it tends to direct the arrow's tip to the dimple 27 formed in the magnet. However, neither these curved surfaces nor the dimple are indispensable features of the invention and the invention likely would function, albeit not as well, with various other configurations. Also, the invention has been illustrated in terms of a device for use with magnetically attractive arrow tips. While it is believed that such an embodiment would be usable with virtually all modern arrows, there maybe some arrows without magnetic tips and, in fact, the invention might be used to determine the straightness and balance of almost any type of elongated rod. For these other purposes, means other than a magnet might be used to suspend the arrow or rod from the device as it is spun. Thus, any means for suspending the arrow in mid-air while simultaneously allowing it to be spun for observation is contemplated by the present invention. Finally, the device of this invention has been described in terms of checking the balance of an entire archer arrow. Modern arrows usually have shafts onto which a variety of broadheads can be threaded. The device of this invention is also very useful for checking the balance of these broadheads alone prior to their attachment to an arrow. Accordingly, references in this application to checking the condition of an arrow encompasses the checking of broadheads alone as well as arrows. These and other additions, deletions, and modifications might well be made to the preferred embodiments illustrated herein without departing from the spirit and scope of the invention as set forth in the claims.

I claim:

1. A method of determining the straightness and balance of an archery arrow having a longitudinal axis and a ferrous tip, said method comprising the steps of:

(a) providing a magnet positioned in a location that is elevated a distance at least equal to the length of an archery arrow for which straightness and balance is to be determined;

(b) providing a ring fixed below the magnet and positioned such that the shaft of an arrow suspended by its tip from the magnet passes through the ring;

(c) suspending the archery arrow by its ferrous tip from the elevated magnet;

(d) spinning the archery arrow about its longitudinal axis while the arrow is suspended from the elevated magnet; and (e) observing the suspended spinning arrow relative to said fixed ring to detect lateral perturbations in the arrow's movement that are indicative of a warped or imbalanced arrow, whereby the straightness and balance of the arrow are determined quickly and accurately and the arrow can be discarded or repaired if imbalance or warp are indicated.

2. A method of determining the straightness and balance of an archery arrow as claimed in claim 1 and wherein step (a) comprises fixing the magnet to a support frame and fixing the support frame to an elevated structure.

3. A method of determining the straightness and balance of an archery arrow as claimed in claim 2 and wherein the step of fixing the support to an elevated structure comprises mounting the support to a vertical wall.

4. A method of determining the straightness and balance of an archery arrow as claimed in claim 1 and wherein step (c) comprises bringing the ferrous tip of the archery arrow into contact with the elevated magnet so that the arrow tip is attracted to and becomes movably and removably adhered to the magnet to suspend the arrow from the magnet by its ferrous tip.

5. A method of determining the straightness and balance of an archery arrow as claimed in claim 1 and wherein step (d) comprises grasping the arrow between the thumb and finger and manipulating the thumb and finger to spin the arrow about its longitudinal axis.

6. A method of determining the trueness of an elongated rod having a longitudinal axis and first and second ends, said method comprising the steps of suspending the rod from an elevated location by its first end with the rod passing through a stationary ring, spinning the rod about its longitudinal axis while the rod is suspended from the elevated location, and observing the spinning rod in relationship to the fixed ring to detect perturbations in its movement indicative of a lack of trueness in the rod.

7. The method of claim 6 and wherein the first end of the rod is magnetically attractive and wherein the step of suspending the rod from an elevated location comprises providing a magnet positioned at an elevated location and moving the first end of the rod into engagement with the magnet.

8. The method of claim 7 and wherein the elongated rod is an archery arrow.

9. The method of claim 8 and wherein the first end of the archery arrow bears a magnetically attractive tip.

10. The method of claim 9 and wherein the tip is fabricated of a ferrous material.

11. The method of claim 7 and wherein the step of providing a magnet positioned at an elevated location comprises fixing the magnet to a support frame and mounting the support frame to an elevated structure.

12. The method of claim 11 and wherein the elevated structure comprises a vertical wall and wherein the support frame is configured to extend substantially horizontally from the wall with the magnet being fixed to the distal end portion of the support frame spaced from the wall.

13. A device for use in determining the straightness and balance of an archery arrow having a longitudinal axis and ends, said device comprising a support frame adapted to be mounted at a location elevated a distance at least equal to the length of an archery arrow for which straightness and balance are to be determined, suspension means on said support frame for rotatably suspending an archery arrow in a substantially vertical orientation from said support frame, and a stationary ring on said support frame positioned below and axially aligned with said suspension means so that the shaft of an arrow suspended from said suspension means passes through said stationary ring whereby an archery arrow can be suspended from said support frame and spun about its longitudinal axis while suspended to allow observation of perturbations in movement relative to the stationary ring that are indicative of a defect in the straightness or balance of the arrow.

14. The device of claim 13 and wherein said suspension means comprises a magnet for rotatably suspending archery arrows having a magnetically attractive tip.

15. The device of claim 14 and wherein said support frame is generally elongated having a first and a second end and wherein said magnet is fixed to said support frame adjacent its said second end.

16. The device of claim 15 and wherein said first end of said support frame is configured to be mounted to an elevated structure with the support frame extending outwardly from the elevated structure to position said magnet at an elevated location spaced from the elevated structure.

17. The device of claim 16 and wherein said support frame first end is configured to be mounted to a vertical wall with the support frame extending substantially horizontally from the wall to its said second end.

18. The device of claim 14 and wherein said magnet is formed with a dimple for receiving and positioning the magnetically attractive tip of an archery arrow.

19. The device of claim 18 and wherein said dimple has a generally circular cross-section.

20. The device of claim 18 and wherein said dimple has a generally parabolic cross-section.

21. A device for use in determining the trueness of an archery arrow having a longitudinal axis and a magnetically attractive end, said device comprising a generally elongated support frame having a first end and a second end with said first end being configured to be mounted to an elevated structure to position said second end at a location spaced from the structure, a magnet mounted to said support frame adjacent said second end for receiving and rotatable holding the magnetically attractive end of the arrow to suspend the arrow by its end from said magnet and a stationary reference means on said support frame positioned below said magnet and adjacent to the shaft of an arrow suspended from the magnet whereby said suspended arrow can be spun about its longitudinal axis to allow observation of perturbations in movement of the spinning arrow relative to the stationary ring that are indicative of a lack of trueness of the arrow.

22. The device of claim 21 and wherein said stationary reference means comprises a ring mounted below said magnet and positioned such that the shaft of an arrow suspended from the magnet passes through said ring.

* * * * *